R. MURPHY.
DUST PROOF CAP.
APPLICATION FILED JUNE 22, 1916.
1,226,240.
Patented May 15, 1917.
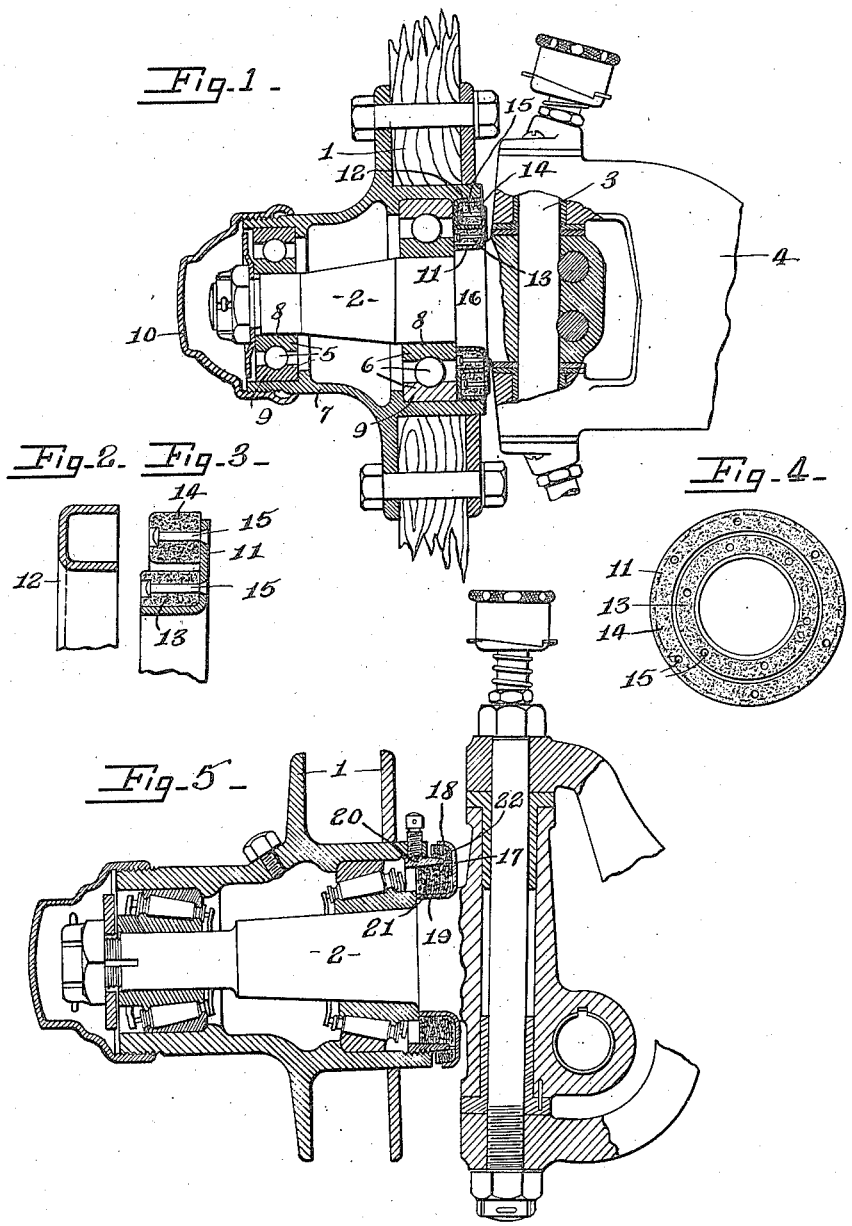
INVENTOR
Ralph W. Murphy.
BY
Parsons & Bodell
ATTORNEYS

UNITED STATES PATENT OFFICE.

RALPH MURPHY, OF SYRACUSE, NEW YORK, ASSIGNOR TO H. H. FRANKLIN MANUFACTURING COMPANY, OF SYRACUSE, NEW YORK, A CORPORATION OF NEW YORK.

DUST-PROOF CAP.

1,226,240.

Specification of Letters Patent.

Patented May 15, 1917.

Application filed June 22, 1916. Serial No. 105,172.

*To all whom it may concern:*

Be it known that I, RALPH MURPHY, a citizen of the United States, and a resident of Syracuse, in the county of Onondaga and State of New York, have invented a certain new and useful Dust-Proof Cap, of which the following is a specification.

This invention has for its object a particularly simple and efficient dust-proof cap for the antifriction bearings of wheels, such as vehicle wheels, which is particularly simple in construction, and highly efficient in use; and it consists in the novel combinations and features of construction hereinafter set forth and claimed.

In describing this invention, reference is had to the accompanying drawings, in which like characters designate corresponding parts in all the views.

Figure 1 is a fragmentary sectional view of a bearing embodying one form of my invention, contiguous parts being also shown.

Figs. 2 and 3 are fragmentary sectional views of the members of the dust cap shown in Fig. 1.

Fig. 4 is a face view of one of the members of the dust cap.

Fig. 5 is a view similar to Fig. 1 of another form of my invention.

This dust proof cap comprises, generally, two members in the form of rings associated respectively with two elements, one of which is rotatably mounted on the other, one member of the cap including inner and outer concentric pads, and the other member comprising a flange extending between the pads.

I have here shown my invention as embodied in a front wheel and axle of an automobile, and 1 and 2 designate respectively two elements, as a wheel mounted on an axle or spindle 2, the axle or spindle 2 extending from the steering knuckle 3 carried at each end of the front axle 4 of an automobile.

5 and 6 designate antifriction or ball bearings at the outer and inner ends of the hub 7 of the wheel, each bearing consisting of inner and outer rings 8, 9, fixed respectively to the axle 2 and the hub 7, and balls running in raceways in the rings. The outer end of the hub 7 is closed by the usual cap 10, while the inner end is closed by my dust-proof cap.

11 and 12 designate the members of this cap which are fixed respectively to the axle 2 and the hub 7 at the inner end of the hub. The inner member 11 comprises a ring shaped body angular in cross-section and having cylindrical and flat flanges which meet to form an angle, and inner and outer spaced apart concentric pads 13, 14. The inner pad 13 is located in the angle of the body of the member 11 and lies on the cylindrical flange, and the outer pad 14 is carried by the vertical flange of the body, these pads being secured in position in any suitable manner, as by fastening members or rivets 15 extending therethrough parallel to the axis of the member 11.

When the member 11 is in position, its cylindrical flange is fixed to a suitable seat 16 provided at the inner end of the spindle 2. The member 12 is here shown as a ring in the form of a channel in cross-section, arranged with its channel extending laterally in position to receive the outer pad 14 so that the bottom of the channel is flat and the side walls cylindrical. The inner side wall extends between the pads 13, 14 and the other side wall laps the periphery of the outer pad 14. Usually the inner edge of the inner wall located between the pads, abuts against the flat flange of the member 11. The ring 12 is secured within the hub in any suitable manner.

In the form of the member 11 shown in Figs. 1 and 3, the body of said member is in the form of a reversed L, and in the form shown in Fig. 5, said member, designated 17, is in the form of a channel with the outer side wall 18 shorter than the inner side wall 19; and the member associated with the hub 1 is a cylindrical ring 20 which threads into the inner end of the hub and extends between the inner and outer pads 21, 22.

In operation, the inner member 11 is mounted upon, and fixed to, the axle or spindle 2, while the member 12 is secured in the hub 1 at the inner end thereof, and when the wheel is mounted on the spindle, the member 12 fits or telescopes with the pads of the member 11.

What I claim is:—

1. A dust-proof cap for bearings comprising a member, and inner and outer concentric pads supported by said member, and a second member having an annular flange between the pads, substantially as and for the purpose described.

2. The combination with two elements, one of which is rotatably mounted on the other, and antifriction bearings between said elements; of a dust-proof cap including members associated respectively with said elements, one member comprising a ring angular in cross-section and provided with inner and outer concentric annular pads carried in the angular portion thereof, and the other member having a flange extending between the pads, substantially as and for the purpose specified.

3. The combination with two elements, one of which is rotatably mounted on the other, and antifriction bearings between said elements; of a dust-proof cap including members associated respectively with said elements, one member having inner and outer concentric annular pads, and the other member being a ring in the form of a channel in cross-section with the channel facing laterally with one of the side walls of the channel extending into the space between the pads, and the opposite side wall thereof lapping the periphery of the outer pad, substantially as and for the purpose set forth.

4. The combination with two elements, one rotatably mounted on the other, and an antifriction bearing between the elements; of a dust-proof cap comprising members associated respectively with said elements, one member being in the form of a ring substantially L-shaped in cross-section and having inner and outer concentric pads, the inner pad being arranged in the angle of said L-shaped member, and the other member comprising a ring in the form of a channel with the open side of the channel facing laterally, the latter member being arranged to inclose the outer pad with one side wall of its channel extending between the pads, substantially as and for the purpose described.

5. The combination with an axle, a wheel having its hub mounted on the axle, and antifriction bearings located in the hub between the axle and said hub; of a dust-proof cap including a member mounted on the axle, and having inner and outer concentric pads, and a second member including a ring fixed to the hub and having a flange extending between the pads, substantially as and for the purpose specified.

6. The combination with an axle, a wheel having a hub mounted on the axle, and antifriction bearings located in the hub; of a dust-proof cap comprising a ring mounted on the axle at the inner side of the hub and being angular in cross-section with the angle thereof facing the hub, and having inner and outer concentric pads, the inner pad being arranged in the angle of said member, and a ring in the form of a channel in cross-section fixed to the hub with its channel facing laterally and inclosing the outer pad with the inner side wall of the channel extending between the pads, substantially as and for the purpose set forth.

7. A dust-proof cap for bearings comprising annular members, each being angular in cross-section and including flat flanges and cylindrical flanges which meet to form the angle, said members being arranged with the cylindrical flanges extending toward each other, concentric pads carried by one of the members on the side thereof opposed to the other, and the cylindrical flange of the latter extending between the pads, substantially as and for the purpose described.

In testimony whereof, I have hereunto signed my name at Syracuse, in the county of Onondaga, and State of New York, this 6th day of June, 1916.

RALPH MURPHY.